Feb. 3, 1959        H. M. ALLARD        2,871,517

INJECTION MOLDING MACHINE NOZZLE

Filed Aug. 31, 1955        7 Sheets-Sheet 1

Feb. 3, 1959 H. M. ALLARD 2,871,517
INJECTION MOLDING MACHINE NOZZLE
Filed Aug. 31, 1955 7 Sheets-Sheet 2
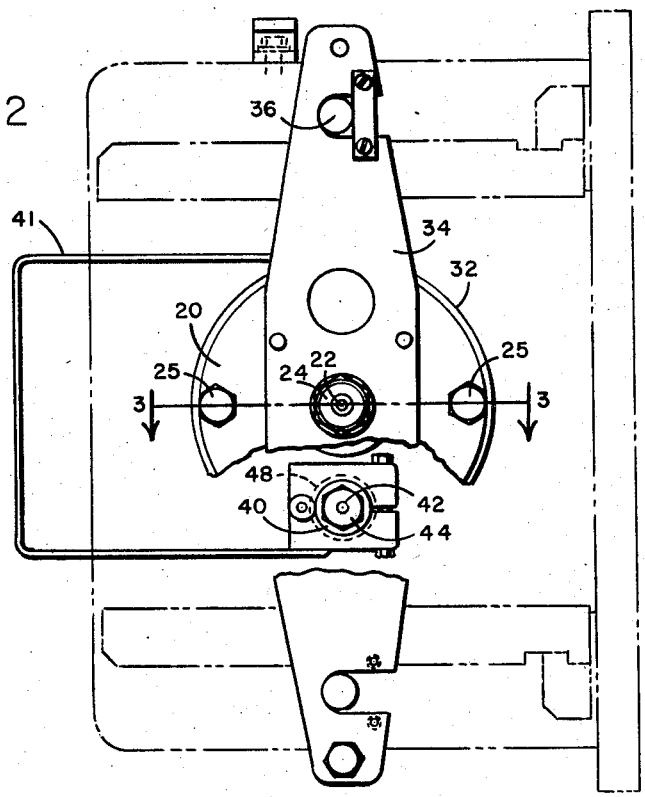
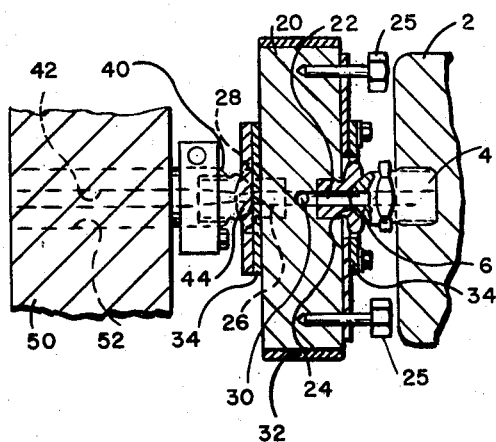

Feb. 3, 1959     H. M. ALLARD     2,871,517
INJECTION MOLDING MACHINE NOZZLE
Filed Aug. 31, 1955     7 Sheets-Sheet 4

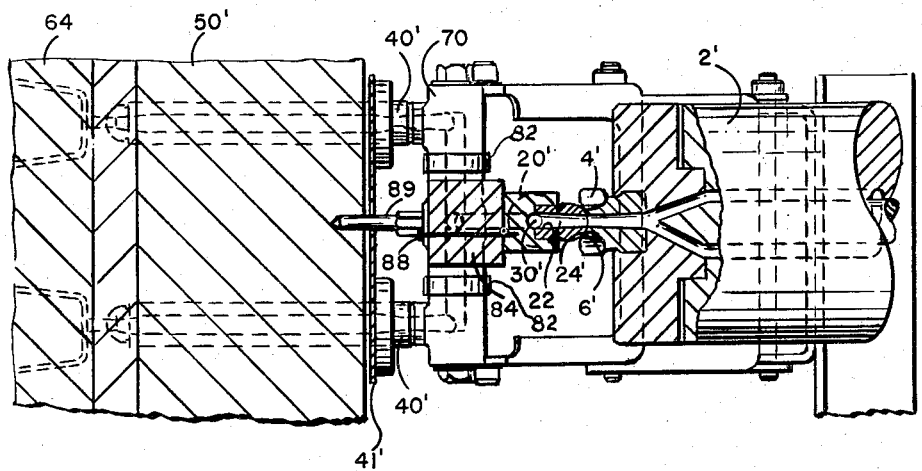
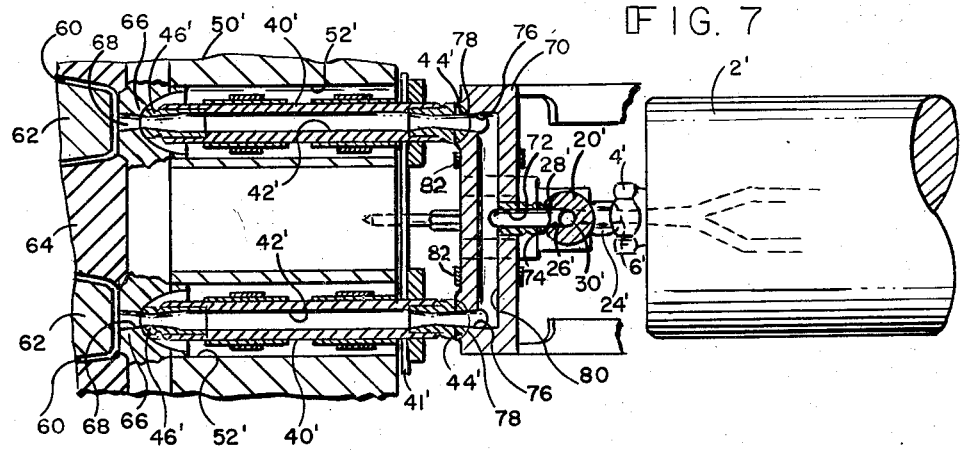

Feb. 3, 1959   H. M. ALLARD   2,871,517
INJECTION MOLDING MACHINE NOZZLE
Filed Aug. 31, 1955   7 Sheets-Sheet 6
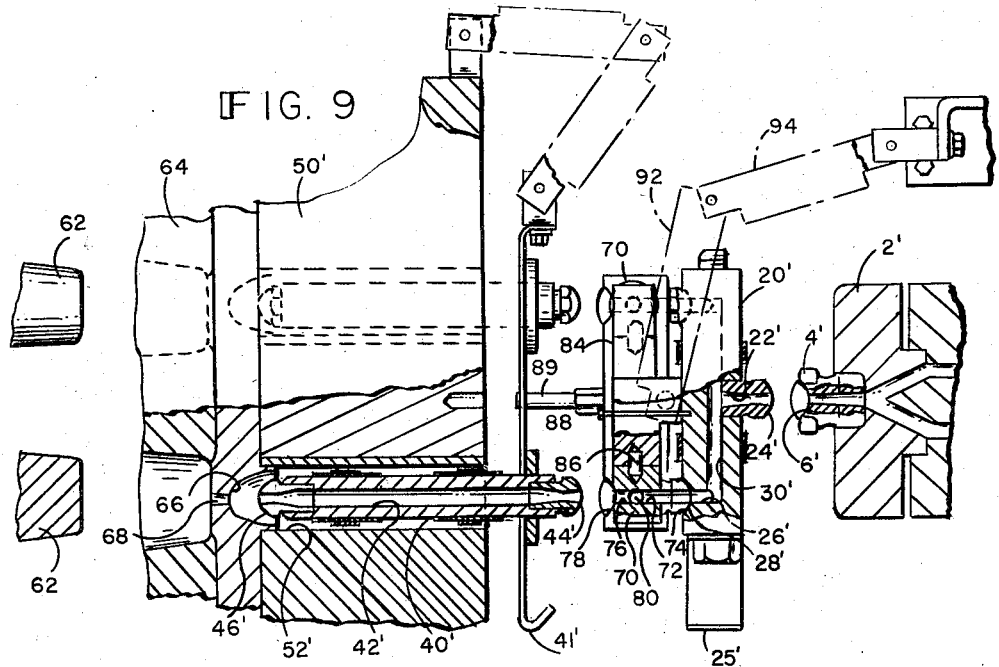
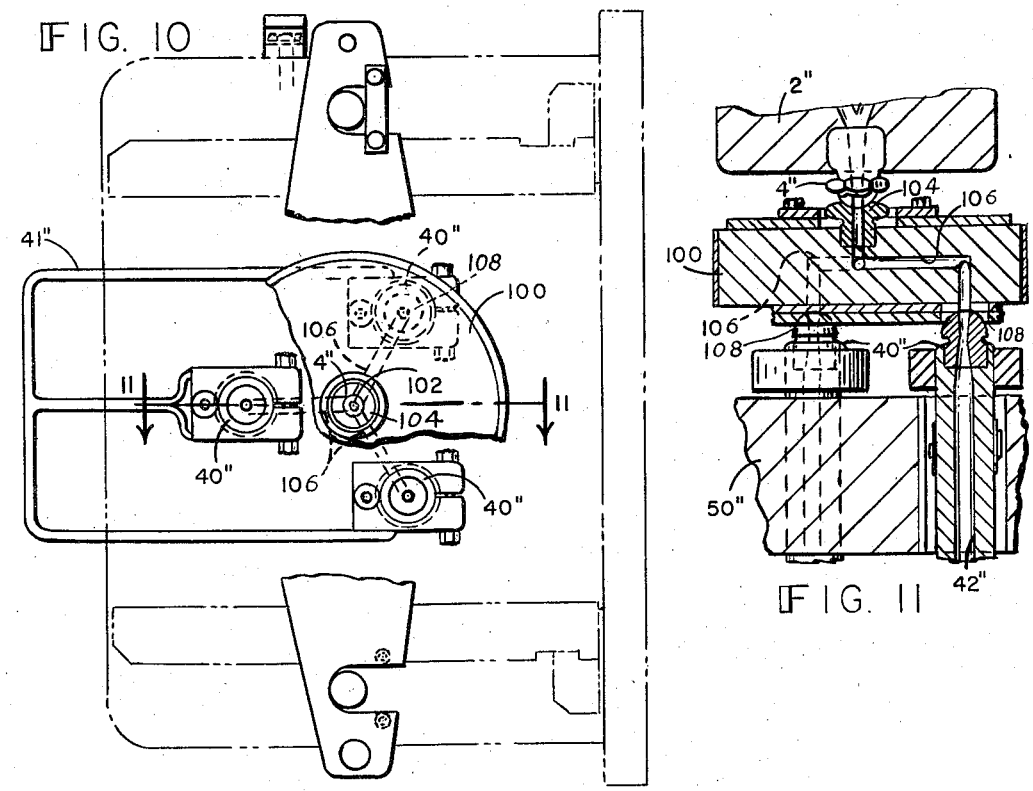

United States Patent Office 2,871,517
Patented Feb. 3, 1959

2,871,517

INJECTION MOLDING MACHINE NOZZLE

Harrie M. Allard, Nashua, N. H., assignor to Improved Machinery, Inc., Nashua, N. H., a corporation of Maine Application August 31, 1955, Serial No. 531,757

6 Claims. (Cl. 18—30)

This invention relates to injection molding machines for molding plastic articles, and more particularly, to novel means for injecting plastic material from a single injection cylinder into a plurality of molds, as well as to a novel nozzle means.

In the manufacture of injection molded articles, such as plastic cups, for example, it has been known to be desirable to mold the article in finished condition so that the usual sprue need not be removed. This has been accomplished in single cavity molds by the use of a suitably heated and temperature controlled injection nozzle which is arranged to be positioned very close to the mold cavity, so that the resulting sprue is so short as to be negligible. However, with molds having more than one cavity, it has proved impractical to use this arrangement by providing a plurality of injection nozzles supplied by a single injection cylinder, since the necessary accuracy of the structure was so high as to make the manufacture and maintenance thereof far too expensive for general use.

It is an object of the present invention to provide a relatively simple structure whereby a plurality of mold cavities may be simultaneously filled by a single injection cylinder. Furthermore, the structure provided need not be any more highly accurate as to its manufacture than are the present molding machine structures. Also, as an important feature of the invention, the structure provided is such that it may be used with existing types of single injection cylinder molding machines so that either multiple article molding or single article molding may readily be carried out as desired, simply by moving certain of the elements into and out of position and by making minor adjustments to the machine.

Another object of the invention is to provide a novel injection nozzle structure having temperature measuring means therein.

For the purpose of more fully explaining preferred embodiments of the invention, reference is made to the following drawings, wherein:

Fig. 2 is an end view, partially broken away, of the structure of Fig. 1;

Fig. 3 is a detail cross-sectional side elevational view of a portion of the structure of Fig. 1;

Fig. 6 is a cross-sectional side elevational view of the structure of Fig. 5, taken on the line 6—6 thereof;

Fig. 7 is a cross-sectional side elevational view of the structure of Fig. 5, taken on the line 7—7 thereof;

Fig. 9 is a view of the structure of Fig. 5 in open, inoperative condition;

Fig. 10 is an end view, partially broken away, of a modification of the structure of Fig. 1;

Fig. 11 is a detail cross-sectional side elevational view of a portion of the structure of Fig. 10;

Figure 1:
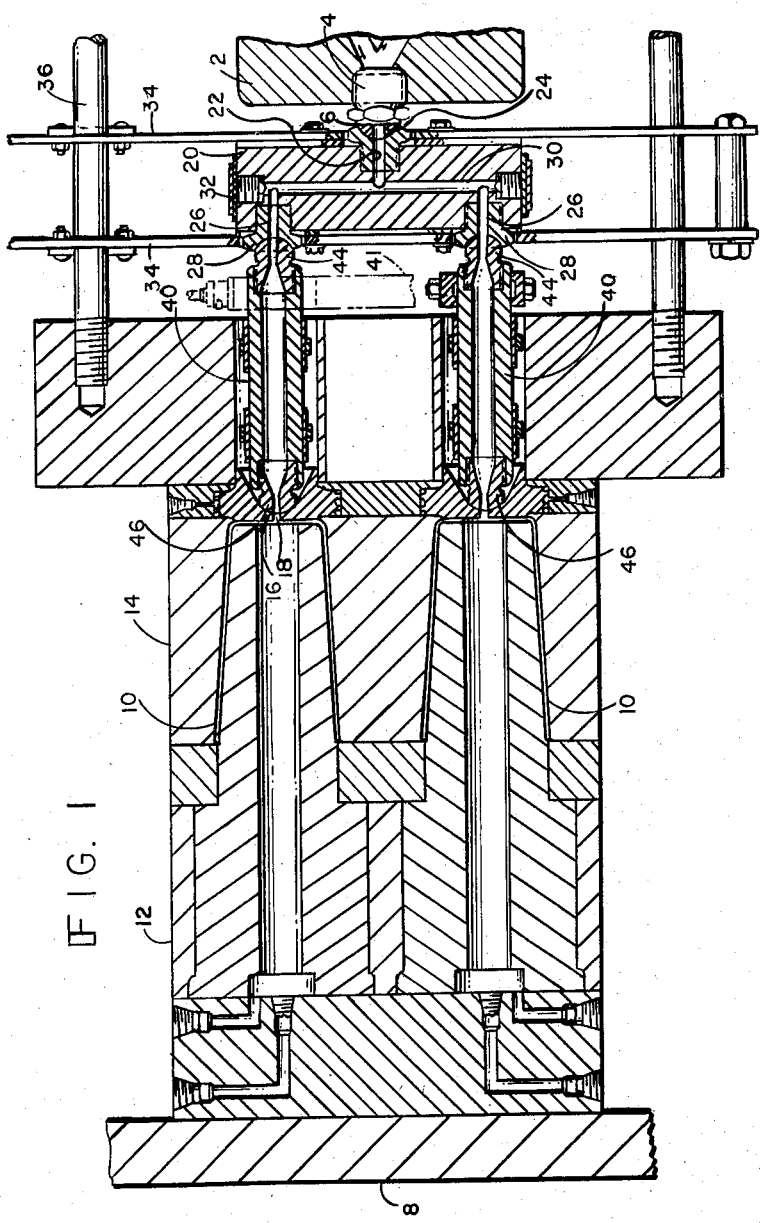
Fig. 1 is a cross-sectional plan view of a first embodiment of the invention as for a double cavity mold.

In Figs. 1 through 4 is shown an embodiment of the invention wherein a two cavity mold is arranged to be filled by a single cylinder injection molding machine having a single injection nozzle. The same type of structure with suitable modification is also useful for filling three cavity molds, but for molds having four or more cavities another embodiment of the invention is preferable, all as hereinafter explained in reference to Figs. 5 through 9.

Referring now to Figs. 1 through 4, the conventional injection molding machine structure includes an injection cylinder 2 having mounted therein an injection nozzle 4 with a convex pressure fitting 6 communicating with said cylinder, and a mold supporting plate 8, said cylinder and plate being relatively movable toward and away from one another by any means known to the art, such as a hydraulic cylinder, to open and close the molding machine elements. According to the present invention, however, instead of the conventional single cavity mold, there is provided on said plate a suitably cooled mold having two cavities 10 formed between the male portion 12 and the female portion 14 of the mold. A concave pressure fitting 16 in the face of the mold has a passage 18 communicating with the bottom of each of the mold cavities 10. The passage 18 is of short enough length so that after the cavities 10 are filled with plastic to form an article such as a plastic drinking glass, the resulting sprue is of such length as to require no finishing step on the bottom of such glass. A typical length of said passage 18 is about 0.020 inch, with a diameter of 0.040 inch.

In order to transfer the plasticized material from the injection nozzle 4 to the two mold cavity passages 18 without leakage due to misalignment, this invention provides a cross head 20 having a generally T-shaped passage therein and a pair of transfer nozzles 40 between said cross head and each of the mold passages 18, such two elements between the injection nozzle 6 and mold portion 14 rendering the structure sufficiently capable of self-aligning movement so that impractical accuracy in machine dimensions need not be achieved to prevent leakage.

In more detail, the cross head 20 extends transversely of the machine and has a central inlet passage 22 with a pressure fitting 24 for engaging the injection nozzle pressure fitting 6 to receive plasticized material therefrom, a pair of vertically spaced bolts 25 providing vertical alignment of head 20. The ends of the cross head have outlet passages 26 with concave pressure fittings 28, said outlet passages being connected to inlet passage 22 by a suitable bore 30. Heat may be supplied to the cross head by a suitable resistance heating element band 32 so that the material therein may be maintained in plastic condition. The cross head 20 is supported for swinging movement into and out of operating position by a pair of arms 34 pivoting on a supporting shaft 36.

Interposed between the cross head outlet pressure fittings 28 and the mold pressure fittings 16 are a pair of independent transfer nozzles 40 mounted on a common handle 41, each of said nozzles having a central passage 42 with a convex pressure fitting 44 at one end for engaging a cross head outlet fitting 28, and a convex pressure fitting 46 at its other end for engaging a mold pressure fitting 16. Heating element bands 48 are provided around each of said transfer nozzles. The transfer nozzles are loosely supported in bores 52 in a supporting plate 50, so that they may readily align themselves with the mold and cross head fittings when the mold is closed.

To provide a satisfactory seal at the above enumerated pressure fittings, it is preferred that such fittings be of generally hemispherical shape, both concave and convex, so that errors in alignment of the machine elements will not cause leakage.

Figure 4:
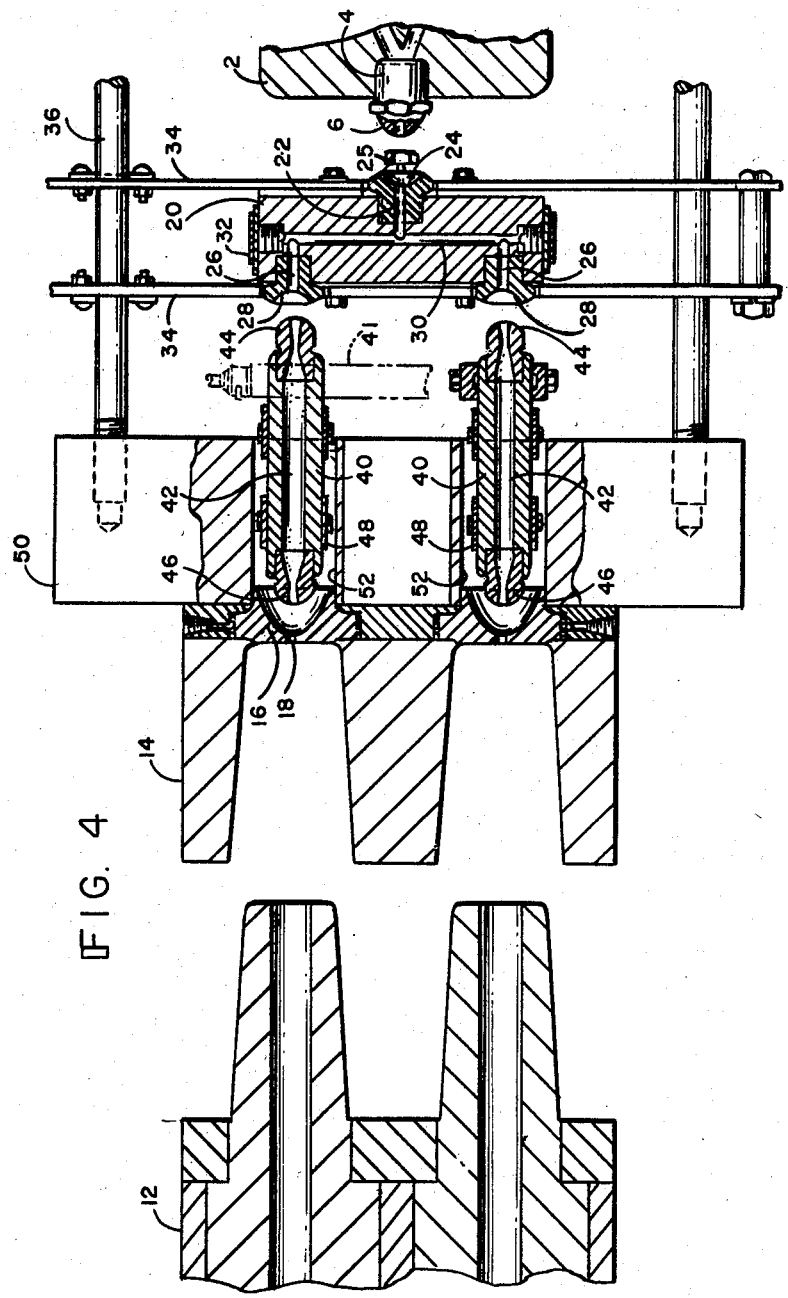
Fig. 4 is a view of the structure of Fig. 1 in open, inoperative condition.
Figure 5:
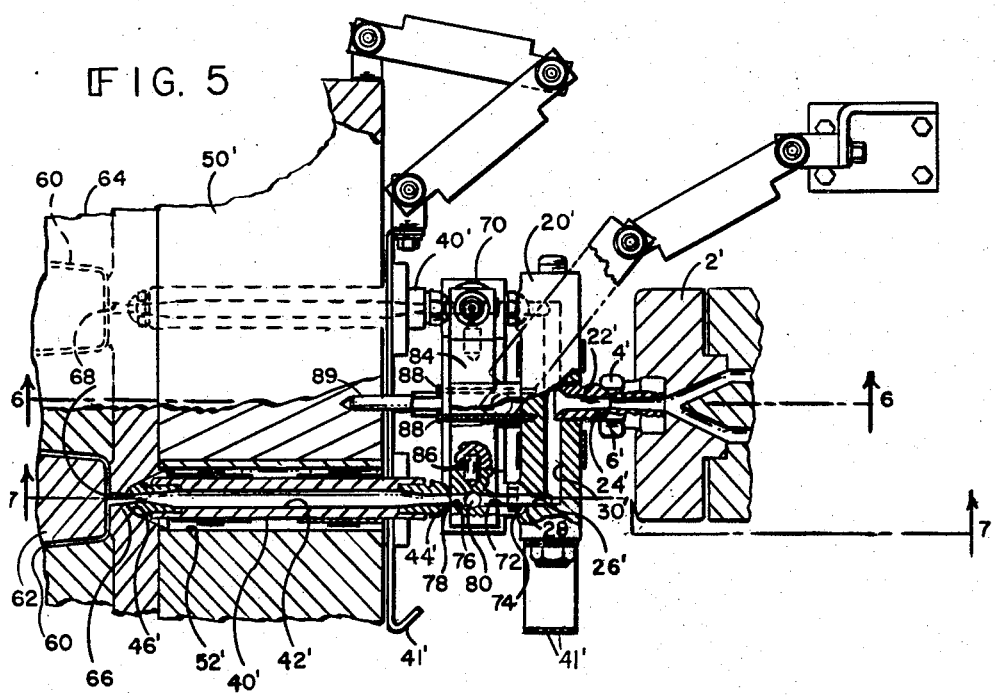
Fig. 5 is a cross-sectional plan view of a second embodiment of the invention as for a four cavity mold.
Figure 8:
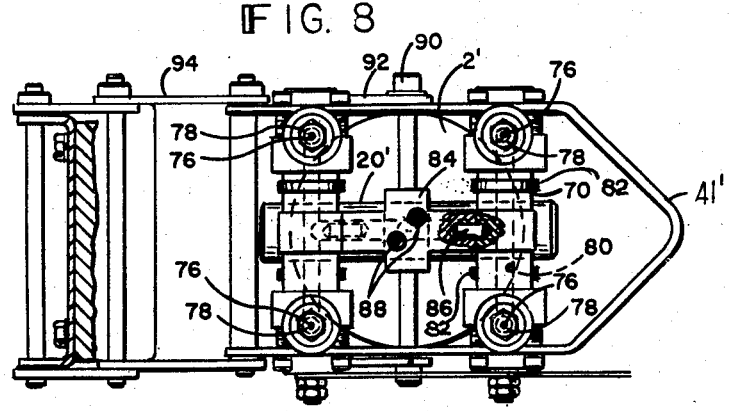
Fig. 8 is an end view, partially broken away, of the structure of Fig. 5.

In operation then, with the mold in open condition as shown in Fig. 4, with the transfer nozzles 40 loosely supported in their bores 52, and with the cross head 20 swung into operative position, the conventional injection molding machine structure is operated to close the mold and to move the mold and injection nozzle 4 toward one another. Such movement clamps the cross head 20 and transfer nozzles 40 together between the injection nozzle 4 and the mold inlet passages 18, the spherical pressure fittings seating themselves and self-aligning the elements so that they are pressure-tight, bolts 25 operating to prevent excess tilting of cross head 20. The injection cylinder is then operated to move sufficient material to be molded from the injection nozzle to fill the mold cavities, the passages of the transfer nozzles and the cross head being filled with plastic material from a previous cycle and maintained at a desired temperature by their heating elements. As soon as the material in the mold cavities hardens sufficiently to be removed, the machine is opened, the finished molded articles removed, and the cycle repeated.

In Figs. 5 through 9 is shown another form of the invention suitable for use with molds having four or more cavities, such including additional elements necessary for accurate self-aligning sealing of the structure.

Thus, as in the first described embodiment, the conventional injection molding machine structure includes an injection cylinder 2' having mounted therein an injection nozzle 4' with a convex pressure fitting 6' communicating with said cylinder. On a mold supporting plate is a suitably cooled mold having four cavities 60 as at the corners of a square, said cavities being formed between the male portion 62 and the female portion 64 of the mold. Four concave pressure fittings 66 are provided in the face of the mold, said fittings each having a passage 68 communicating with the bottom of each of the mold cavities 60. As before, the passage 68 is of short enough length so that after the cavities 60 are filled with plastic to form an article such as a plastic drinking glass, the resulting sprue is of such length as to require no finishing step on the bottom of such glass.

In order to transfer the plasticized material from the injection nozzle 4' to each of the four mold cavity passages 68 without leakage due to misalignment, this embodiment of the invention provides additional cross head elements 70 interposed between the ends of the first cross head 20' and the four transfer nozzles 40', each of said cross head elements having a generally T-shaped passage therein connecting one end of the first cross head 20' with two of the transfer nozzles 40' so that the structure will be self-aligning.

In more detail, the cross head 20' extends transversely of the machine and has a central inlet passage 22' with a pressure fitting 24' for engaging the injection nozzle pressure fitting 6' to receive plasticized material therefrom. The ends of the cross head have outlet passages 26' with concave pressure fittings 28', said outlet passages being connected to inlet passages 22' by a suitable bore 30'. Heat may be supplied to the cross head as before. The second cross head elements 70 extend at right angles to the first cross head 20' and each has a central inlet passage 72 with a pressure fitting 74 for engaging a pressure fitting 28' on the first cross head to receive plasticized material therefrom. The ends of each of said second cross heads have outlet passages 76 with concave pressure fittings 78, said outlet passages of each cross head 70 being connected to the inlet passage 72 thereof by a suitable bore 80. All of the pressure fittings are preferably of the spherical type as explained above. Heat may be supplied to cross heads 70 by suitable resistance heating elements 82 so that the plastic material therein may be maintained in plastic condition.

As before, independent transfer nozzles 40' are interposed between the second cross head outlet pressure fittings 78 and the mold pressure fittings 66, such nozzles 40' being four in number arranged as at the corners of a square to individually and simultaneously feed each of the four mold cavities 60. Each of said nozzles 40' has a central passage 42' with convex pressure fittings 44' and 46' at its ends for engaging respectively a cross head outlet fitting 28' and a mold pressure fitting 66. As before, each nozzle 40' is mounted on a frame 41' and is loosely supported in a bore 52' of a supporting plate 50' and each is preferably heated.

Suitable supporting structure is provided for cross heads 20' and 70 so that said cross heads are supported for alignment by their cooperating pressure fittings. Such structure includes a transverse cross bar 84 with its axis extending parallel to the first cross head 20' between the second cross heads 70 generally centrally thereof and at right angles thereto. Each of said cross heads 70 is mounted on said bar 84 for pivotal movement about a pivot pin 86 with its axis generally parallel to the axes of said bar and said first cross head, and said first cross head 20' is mounted on said bar by suitable bolts 88. Bar 84 is also preferably provided with an aligning pin 89 which fits into a suitable bore in plate 50'. This arrangement permits rocking movement of each of the second cross heads about their central inlet pressure fittings 74 for proper seating of the transfer nozzles 40'. For moving the cross head structure to and from operative position, a vertical rod 90 is centrally mounted on bar 84, said rod carrying at its ends pivotally attached links 92 and 94 with the latter links mounted on the machine so that an articulated hinge structure is provided. A similar arrangement is preferably provided for the frame 41'.

The operation of this latter structure is generally similar to that above described, the clamping of the machine additionally serving to clamp the cross heads 20' and 70 firmly together.

In the modification of the structure of Figs. 1 through 4 shown in Figs. 10 and 11, a cross head 100 is provided for engaging the injection nozzle 4", said cross head having an inlet passage 102 with a pressure fitting 104 and three outlet passages 106 with pressure fittings 108 spaced on opposite sides of the central inlet passage as at the corners of an equilateral triangle, three transfer nozzles 40" being interposed between said outlet passages and the inlet passages of a three cavity mold.

As a further modification, such three outlet passage cross heads may be used in the structure of Figs. 5 through 9 if molds having six or more cavities are to be employed. The operation of such structures is generally similar to those above described.

With any of the above described embodiments of the invention, the provision of one or more cross heads each having a central inlet passage with two or three outlet passages transversely spaced on opposite sides thereof, and transfer nozzles connecting each of said outlet passages to a mold cavity, provides a structure having passages interconnecting the injection nozzle and the mold which is balanced as to the forces applied between the injection nozzle and the mold so that the interconnecting elements self-align to properly seat themselves for leak-free operation at the high pressures employed in injection molding. As an example, variations in the lengths of mold cavity inlet fittings or transfer nozzles are compensated for by the tilting of a cross head about its inlet pressure fitting, and the resulting lateral displacement of the cross head outlet fittings is readily accommodated by a slight sideways shift of the cooperating ends of the independent transfer nozzles. Thus, impractically high accuracy in the dimensions of the machine structure are no longer essential, and for the first time a structure is provided wherein a multiple cavity mold without runners or as a hot runner plate may be filled by a single injection cylinder molding machine.

In injection molding apparatus as above described, it is of some importance not only that the various elements be heated, but that the temperature of the plasticized material passing therethrough be rather accurately controlled to avoid on the other hand, hardening of material, and on the other hand, dripping of the nozzles, particularly at the mold. Attempts have been made in the past to accomplish the desired result by the use of thermocouples associated with the injection cylinder, but such placement does not provide the desired accuracy of measurement.

Figure 12:
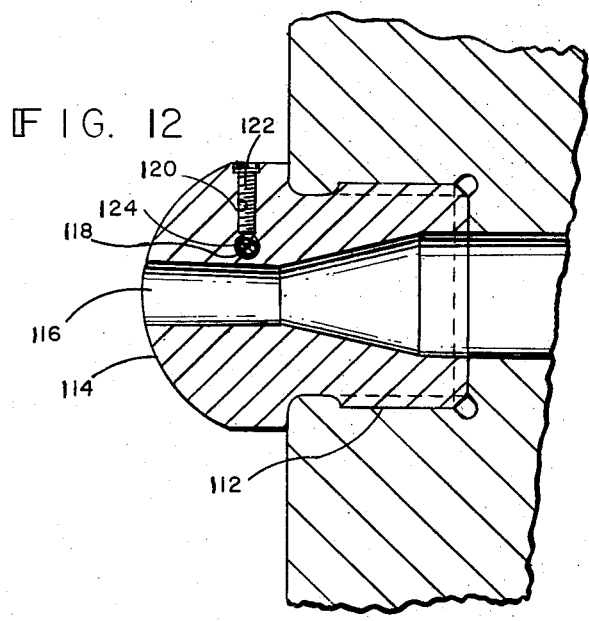
Fig. 12 is a cross-sectional elevational view of the injection nozzle of the invention.
Figure 13:
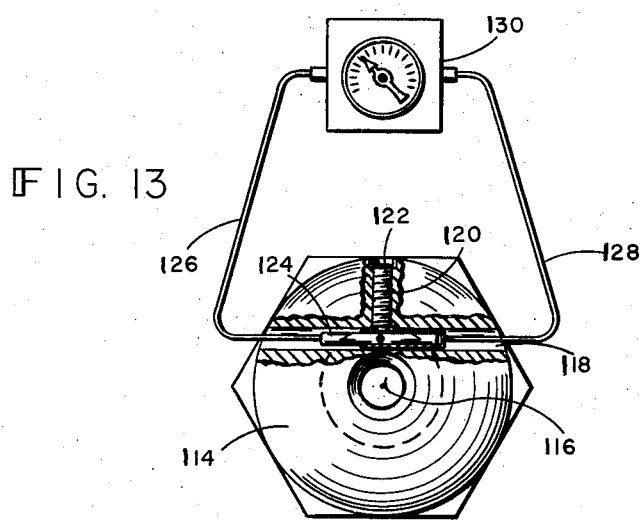
Fig. 13 is an end view, partially broken away, of the nozzle of Fig. 12.

Accordingly, the present invention provides a novel nozzle structure having a thermocouple mounted therein, such thermocouple being readily removable for repair or replacement. As shown in Figs. 12 and 13, then, the nozzle includes a generally cylindrical body 112 having a tip 114 of generally spherical shape forming a pressure fitting for an axial passage 116 in said nozzle for injecting plasticized material into a mold or other machine element. A drilled bore 118 extends transversely through said nozzle body 112 behind the spherical tip 114, said bore being closely adjacent to and spaced from said passage. A tapped hole 120 extends from the nozzle surface to said bore perpendicular thereto, and a clamping screw 122 is mounted therein. A thermocouple element 124 is positioned centrally in bore 118 with its wires 126 and 128 extending outwardly therefrom to an indicating and controlling element 130 located at some convenient distance from the nozzle.

To assemble the nozzle tip, the thermocouple element 124 is slipped into the bore 118, positioned centrally thereof, and clamping screw 122 tightened to releasably retain it in position. Wires 126 and 128 are then connected to element 130.

In operation, due to the close positioning of the thermocouple element 124 to the stream of plasticized material in passage 116, the temperature of the material is accurately measured. Thus, close control of such temperature may be maintained by controlling the usual heating elements (not shown) by the measuring and controlling element 130.

Thus it will be seen that the invention provides a novel injection molding machine structure capable of simultaneously injecting plasticized material from a single injection cylinder into a plurality of mold cavities, as well as one having other features as hereinbefore enumerated. Various modifications of the invention within the spirit thereof and the scope of the appended claims will occur to those skilled in this art.

I claim:

1. In a plastic molding machine including an injection nozzle having a passage with a self-aligning pressure fitting for feeding plasticized material in a stream therefrom, and a mold with a plurality of injection passages with self-aligning pressure fittings, said mold and said injection nozzle being relatively movable toward and away from one another, a cross head having a central inlet passage with a self-aligning pressure fitting for engaging said injection nozzle pressure fitting to receive plasticized material therefrom, and at least two and less than four outlet passages spaced from one another on opposite sides of said inlet passage with self-aligning pressure fittings on opposite sides of said central passage, said outlet passages being connected to said inlet passages for feeding plasticized material therefrom, and a transfer nozzle cooperating with each of said outlet passages, said transfer nozzles having passages with self-aligning pressure fittings for connecting each said cross head outlet passages to one of said mold passages and supporting said cross head from said mold at at least two and less than four spaced positions, one at each of said cross head outlet passages, whereby movement of said mold and said injection nozzle clamps said cross head pressure fittings and said transfer nozzle pressure fittings into operating position in firm pressure contact with one another and with said injection nozzle and mold pressure fittings respectively to provide a structure balanced as to forces applied between said injection nozzle and said mold with its elements free to self align by relative movement of said self-aligning pressure fittings.

2. In a plastic molding machine having an injection nozzle and a mold with a plurality of injection passages, a first cross head having a central inlet passage cooperating with said injection nozzle to receive plasticized material therefrom and at least two and less than four outlet passages on opposite sides of said central passage, a plurality of second cross heads each having a central inlet passage cooperating with each of said first cross head outlet passages and at least two and less than four outlet passages on opposite sides of said second cross head central passage, and a plurality of transfer nozzles for connecting each of said second cross head outlet passages to one of said injection passages of said mold.

3. In a plastic molding machine as claimed in claim 2, wherein said first cross head has two outlet passages, a second cross head is provided for each of said outlet passages, and four transfer nozzles are provided.

4. In a plastic molding machine including an injection nozzle having a passage with a self-aligning pressure fitting for feeding plasticized material in a stream therefrom, and a mold with a plurality of injection passages with self-aligning pressure fittings, said mold and said injection nozzle being relatively movable toward and away from one another, a first cross head having a central inlet passage with a self-aligning pressure fitting for engaging said injection nozzle pressure fitting to receive plasticized material therefrom, and at least two and less than four outlet passages spaced from one another on opposite sides of said inlet passage and with self-aligning pressure fittings on opposite sides of said central passage, said outlet passages being connected to said inlet passages for feeding plasticized material therefrom, a plurality of second cross heads each having a central inlet passage with a self-aligning pressure fitting for engaging one of said first cross head outlet passage pressure fittings to receive plasticized material therefrom and at least two and less than four outlet passages spaced from one another on opposite sides of said inlet passage with self-aligning pressure fittings, said outlet passages being connected to said inlet passages for feeding plasticized material therefrom, and a transfer nozzle with each of said outlet passages of said second cross heads, said transfer nozzles having passages with self-aligning pressure fittings for connecting each of said second cross head outlet passages to one of said mold passages and supporting each of said second cross heads from said mold at at least two and less than four spaced positions, one at each of said second cross head outlet passages, said second cross heads in turn supporting from said mold at at least two and less than four spaced positions said first cross head, one at each of said first cross head outlet passages, whereby movement of said mold and said injection nozzle clamps said cross head pressure fittings and said transfer nozzle pressure fittings into operating position in firm pressure contact with one another and with said injection nozzle and mold pressure fittings respectively to provide a structure balanced as to forces applied between said injection nozzle and said mold, with its elements free to self align by relative movement of said self-aligning pressure fittings.

5. In a plastic molding machine as claimed in claim 6, further having interposed between said first cross head and each of said transfer nozzles, a plurality of second cross heads each having a central inlet passage with a self-aligning pressure fitting for engaging one of said first cross head outlet passage pressure fittings and at least two and less than four outlet passages spaced from one another on opposite sides of said inlet passage thereof and having self-aligning pressure fittings, each engaging one of said transfer nozzles.

6. In a plastic molding machine including an injection nozzle having a passage with a self-aligning pressure fitting for feeding plasticized material in a stream therefrom, and a mold with at least two and less than four injection passages with self-aligning pressure fittings, said mold and said injection nozzle being relatively movable toward and away from one another, a cross head having a central inlet passage with a self-aligning pressure fitting for engaging said injection nozzle pressure fitting to receive plasticized material therefrom, and an outlet passage for each of said mold injection passages comprising at least two and less than four outlet passages spaced from one another on opposite sides of said inlet passage with self-aligning pressure fittings on opposite sides of said central passage, said outlet passages being connected to said inlet passages for feeding plasticized material therefrom, a transfer nozzle interposed directly between each of said outlet passages and said mold injection passages, said transfer nozzles having passages with self-aligning pressure fittings for connecting each said cross head outlet passage to one of said mold passages and supporting said cross head from said mold at at least two and less than four spaced positions, one at each of said cross head outlet passages, and supporting means loosely supporting said cross head and said transfer nozzles for movement to and from operative position and for aligning movement of said cross head and said transfer nozzles upon movement into operative position, whereby movement of said mold and said injection nozzle clamps said cross head pressure fittings and said transfer nozzle pressure fittings into operating position in firm pressure contact with one another and with said injection nozzle and mold pressure fittings respectively to provide a structure balanced as to forces applied between said injection nozzle and said mold with its elements free to self align by relative movement of said self-aligning pressure fittings free of interference from said supporting means.

References Cited in the file of this patent
UNITED STATES PATENTS

| | | |
|---|---|---|
| 2,227,263 | Knowles | Dec. 31, 1940 |
| 2,304,461 | Knowles | Dec. 8, 1942 |
| 2,365,282 | Lester et al. | Dec. 19, 1944 |
| 2,471,683 | Halbach | May 31, 1949 |
| 2,551,439 | Kovacs | May 1, 1951 |
| 2,671,936 | Sundwick | Mar. 16, 1954 |